United States Patent
Harvey et al.

(10) Patent No.: US 6,857,419 B1
(45) Date of Patent: Feb. 22, 2005

(54) FUEL VAPOR SEPARATOR FOR INTERNAL COMBUSTION ENGINE

(75) Inventors: Richard W. Harvey, Logansport, IN (US); Michael S. Richards, Kokomo, IN (US); Gerald R. Hayes, Kokomo, IN (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 10/819,050

(22) Filed: Apr. 6, 2004

(51) Int. Cl.[7] .............................................. F02M 37/04
(52) U.S. Cl. ................................. 123/509; 123/41.31
(58) Field of Search ............................... 123/509, 516, 123/541, 41.31

(56) References Cited

U.S. PATENT DOCUMENTS

| | | | |
|---|---|---|---|
| 4,768,492 A | | 9/1988 | Widmer et al. |
| 5,309,885 A | * | 5/1994 | Rawlings et al. ........... 123/509 |
| 5,647,331 A | * | 7/1997 | Swanson .................... 123/516 |
| 6,012,434 A | | 1/2000 | Hartke et al. |
| 6,135,100 A | * | 10/2000 | Katoh ......................... 123/679 |
| 6,422,207 B1 | | 7/2002 | Kolb et al. |
| 6,581,579 B1 | | 6/2003 | Knight et al. |
| 6,662,786 B2 | | 12/2003 | Watanabe |

* cited by examiner

Primary Examiner—Mahmoud Gimie
(74) Attorney, Agent, or Firm—Howard & Howard

(57) ABSTRACT

A fuel separator is disclosed having a hollow interior in which a tubular coiled heat exchanger is positioned to receive a coolant liquid therethrough. Fuel is fed into the chamber through a fuel inlet and pumped out of the chamber by a high pressure pump into the fuel distribution system of an internal combustion engine. Heated excess fuel from the fuel distribution system of an internal combustion engine is returned to the chamber through a fuel return inlet at the bottom of the chamber and the heated fuel passes upwardly through the coolant coil thereby cooling the heated return fuel. Fuel vapor that is not condensed as a result of cooling can escape from the chamber through a float needle valve at the top of the chamber. A pressure relief valve is also provided at the top of the chamber to allow the vapor to escape when a predetermined internal pressure is reached.

13 Claims, 3 Drawing Sheets

FUEL VAPOR SEPARATOR FOR INTERNAL COMBUSTION ENGINE

BACKGROUND OF THE INVENTION

The present invention is a fuel vapor separator used in a fuel delivery system of an internal combustion engine, and more particularly, a fuel vapor separator for a Marine engine which uses water drawn into the engine from the Marine lake or sea water environment of engine operation for cooling purposes. It is a long recognized problem in the internal combustion engine art that heat build-up of an engine can adversely effect the fuel supply system of the engine thereby causing the fuel to vaporize before it is introduced into the engine's combustion chambers. This condition, commonly referred to as vapor lock, can not only have a damaging effect upon engine components but can result in poor engine performance, overheating and interrupted engine operation. Fuel vapor is particularly disadvantageous in fuel injected engines. Typically, in fuel injection engines, fuel is introduced into a fuel rail by a high pressure fuel pump before it is injected into the combustion chambers by the fuel injectors. The fuel rail is typically heated to relatively high temperatures due to engine combustion heat, and the heated fuel is returned back to the fuel system during periods of low engine use such as idling and start and stop operation.

Usually, the heated fuel from the fuel rail is returned to a vapor separator where any fuel vapor created by the heated fuel is condensed back to liquid fuel before the fuel is reintroduced into the high pressure pump and fuel rail. Such vapor separators heretofore known to the art have used some form of coolant passing through the separator to cool the heated fuel and condense any fuel vapor back into liquid fuel. In most outboard Marine applications, the liquid coolant is supplied from the operating environment and lake or sea water is circulated through the engine for cooling. However, because such water may have contaminants such as weeds, flotsam, or small biological life forms floating in the water, there is a risk that the engine cooling system and vapor separator may become clogged with debris and contaminants. An additional disadvantage of prior art vapor separators is that they can be expensive to manufacturer because of the intricacy of the component parts and long assembly time. Thus, it would be a desirable advanced in the art to have a vapor separator which is relatively easy to fabricate and which reduces the potentiality for clogging with contaminants.

SUMMARY OF THE INVENTION

The present invention relates to a vapor separator for use with a fuel pump assembly of an internal combustion engine. The vapor separator comprises a hollow chamber having a sidewall with a cylindrical interior surface and a top wall and a bottom wall enclosing the chamber. Fuel is introduced into the chamber through a fuel intake which communicates with a source of fuel so that a constant supply of fuel is supplied to the chamber. Fuel is removed from the chamber through an outlet which is connected to a high pressure fuel pump assembly that pumps the fuel into a fuel distribution system for the internal combustion engine such as a fuel rail and fuel injector combination. A hollow cylindrical tube is configured into a coil having a plurality of circular loops that are dimensioned to fit within the cylindrical interior of the chamber. The tube coil is positioned within the chamber and the first and second ends of the tube extend through the wall of the chamber. A source of coolant liquid is connected to the first end of the tube coil so the coolant can flow through the hollow tube coil within the chamber from the first end to the second end of the tube thereby removing heat from the interior of the chamber.

The chamber also has a fuel return intake which receives heated excess fuel from the fuel delivery system of the internal combustion engine. The heated fuel and any resultant fuel vapor is cooled by the coolant flowing through the coil within the chamber to cause any fuel vapor to condense into liquid fuel before being drawn into the fuel pump assembly.

The hollow coiled tube has an interior diameter that is at least as large as the outlet diameter of the connected source of coolant liquid. The coil is also formed without sharp bends or other restrictions that might reduce the internal diameter of the tube and create restricted points where contaminants might lodge. Consequently, because the diameter of the tube is no less than the upstream diameter of the coolant supply, the likelihood of contaminants lodging in the tube coil is extremely limited.

Because the vapor separator might be used in a corrosive environment such as salt water, the components of the fuel separator may be made from corrosive resistant materials such as stainless steel, coated aluminum or plastic.

DETAILED DESCRIPTION OF THE PREFERRED EMBODIMENT

Figure 1:
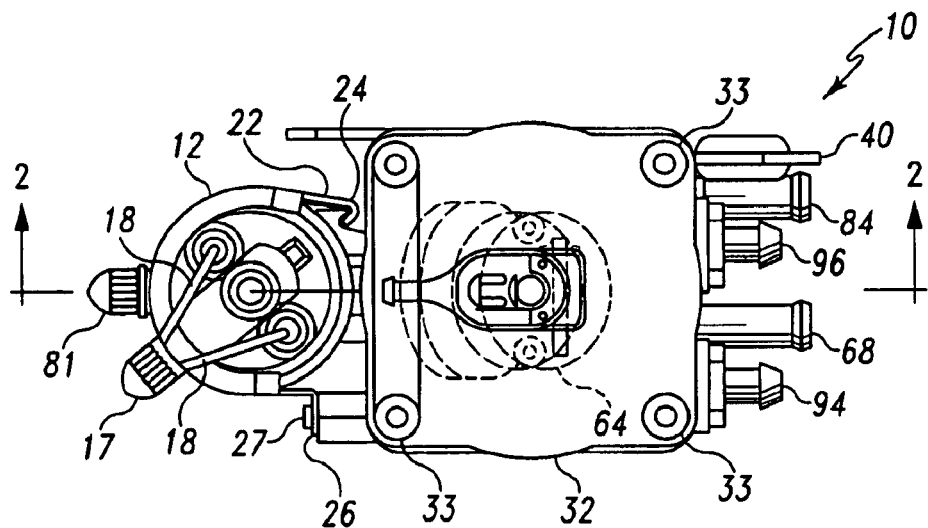
FIG. 1 is a top view of a vapor separator in accordance with the present invention.

With reference to FIGS. 1, 2, 3 and 4, vapor separator assembly 10 comprises a high pressure fuel pump 12 which includes a fuel intake 14 at the bottom of the pump 12 and a fuel pump outlet 16 at the top of pump 12. Electrical power is supplied to pump 12 through wires 18. A schrader valve 17 is provided at the top of pump 12 to allow pressure testing of the outlet pressure. Outlet 16 is connected to the fuel distribution system of an internal combustion engine such as a fuel rail and injector assembly for a fuel injected internal combustion engine (not shown), and fuel is pumped into the fuel distribution system by pump 12. High pressure fuel pump 12 is mounted to the side of fuel separator assembly 20 by a curved metal strap 22. A hooked end 24 is formed on strap 22 which engages a flange on the side of separator assembly 20. A screw mounting 26 is formed at the other end of strap 22 and a screw 27 secures the strap to assembly 20.

Separator assembly 20 also comprises a hollow cylindrical member 28 which surrounds a hollow cylindrical interior chamber 30. Mounted over the top end of cylindrical member 28 is a top wall assembly 32. An O ring seal 34 seals the perimeter of top assembly 32 against the top edge of member 28 to create a liquid and vapor tight seal.

Positioned over the bottom end of hollow member 28 is a bottom wall assembly 36. An O ring seal 38 seals the junction between member 28 and assembly 36 to prevent liquid and vapor leakage. Separator assembly 20 also comprises a mounting flange 40 having an opening 42 formed therethrough. A rubber grommet positioned within the opening 42.

Figure 2:
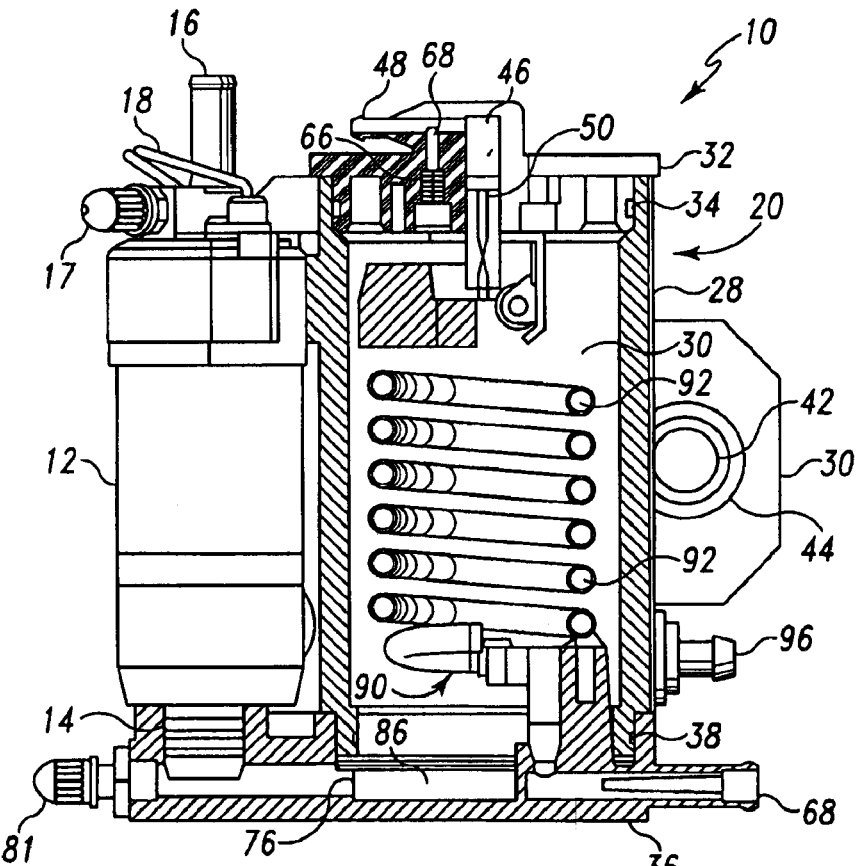
FIG. 2 is a partially cross sectional view of the vapor separator of FIG. 1 taken substantially along line 2—2 in FIG. 1.
Figure 5:
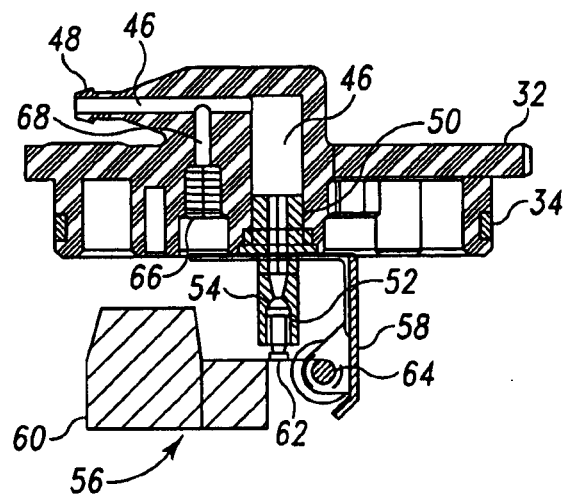
FIG. 5 is a cross section view of the top wall assembly of the vapor separator in accordance with the present invention.
Figure 6:
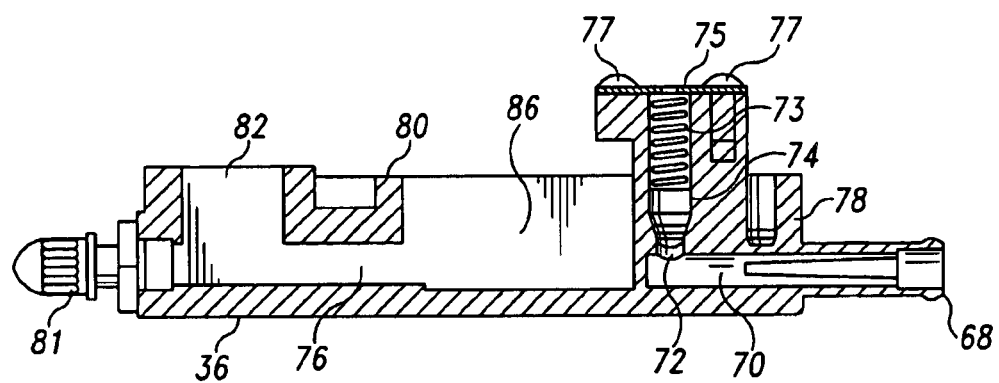
FIG. 6 is a cross section view of the bottom wall assembly of the vapor separator in accordance with the present invention.

With reference to FIGS. 1, 2 and 5, top wall assembly 32 is mounted to cylindrical member 28 by screws 33. A vapor passage 46 which terminates at vapor outlet 48 is formed through top wall assembly 32. Positioned at the lower end of vapor passageway 46 is needle valve assembly 50 which comprises a needle valve plunger 52 and a needle valve seat 54. A float assembly 56 is mounted to needle valve assembly 50 and comprises a support arm 58 and a float 60 attached to one end of float arm 62. The other end of float arm 62 is pivotally mounted to support arm 58 by a pivot pin 64 so that float 60 can pivot up and down. Needle valve plunger 52 is mounted on float arm 62 so that when float 60 is pivoted upwardly needle valve plunger seats against needle valve seat 54 sealing the needle valve. However, when float 60 pivots downwardly, needle valve plunger disengages needle valve seat 54 opening the valve and allowing vapor and air in chamber 30 to pass through the needle valve into vapor passageway 46 and out vapor outlet 48. Vapor outlet 48 is connected to the intake manifold (not shown) of the engine by a tube (not shown).

Top wall assembly 32 also comprises a pressure relief valve 66 which communicates with vapor passageway 46 through a passageway 68. Pressure relief valve 66 operates to open when the pressure within chamber 30 exceeds a predetermined limit to allow internal air and vapor to escape through passage 68 and out outlet 48 to the intake manifold.

With reference to FIGS. 1, 2, 3, 4 and 6, bottom wall assembly 36 has a fuel return inlet 68 which communicates with a passageway 70 formed in assembly 36. An upwardly extending vapor separator inlet orifice 72 is formed at the end of passageway 70 and communicates with the interior of chamber 30. A plunger 74 is positioned within orifice 72 and spring 73 biases plunger 74 downwardly. Spring 73 is held within orifice 72 by a cover plate 75 which is retained by screws 77. Spring biased plunger 74 normally closes orifice 72 but opens when the pressure in passageway 70 exceeds the pressure within chamber 30 to allow returned fuel to enter chamber 30. Fuel return inlet 68 is connected to a fuel return line (not shown) from the fuel rail of the internal combustion engine so that excess fuel from the fuel rail is returned through inlet 68, passageway 70 and orifice 72 into chamber 30 of vapor separator assembly 20. Bottom wall assembly 36 also comprises a hollow interior portion 86 which communicates with chamber 30. A fuel delivery channel 76 connects interior portion 86 at the bottom end of chamber 30 with the fuel intake 14 of pump 12. The lower end of cylindrical hollow member 28 is mounted between flanges 78 and 80 of bottom wall assembly 36 so that the hollow interior chamber 30 communicates with fuel delivery channel 76. Also, formed in bottom wall assembly 36 is a cylindrical orifice 82 dimension to receive the fuel intake 14 of pump 12. A Schrader valve 81 is positioned at the end of channel 76 for drainage and pressure release.

Figure 4:
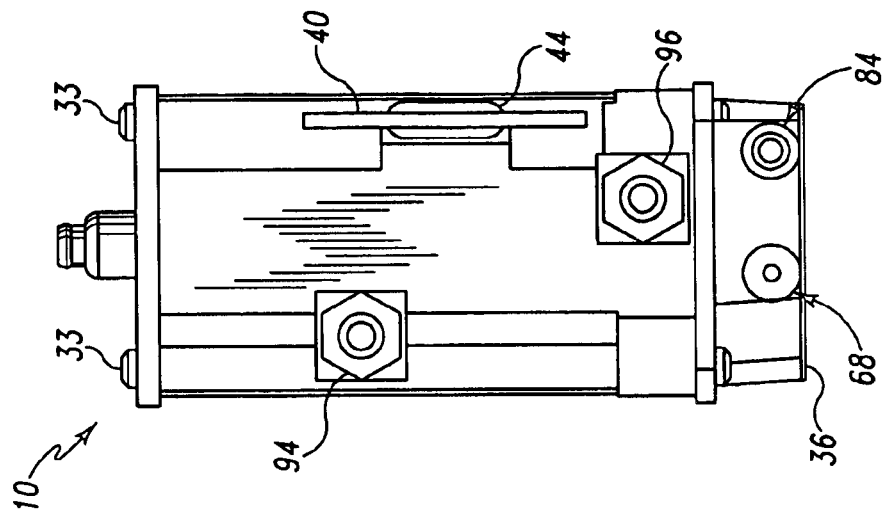
FIG. 4 is an end plan view of the vapor separator in accordance with the present invention.
Figure 3:
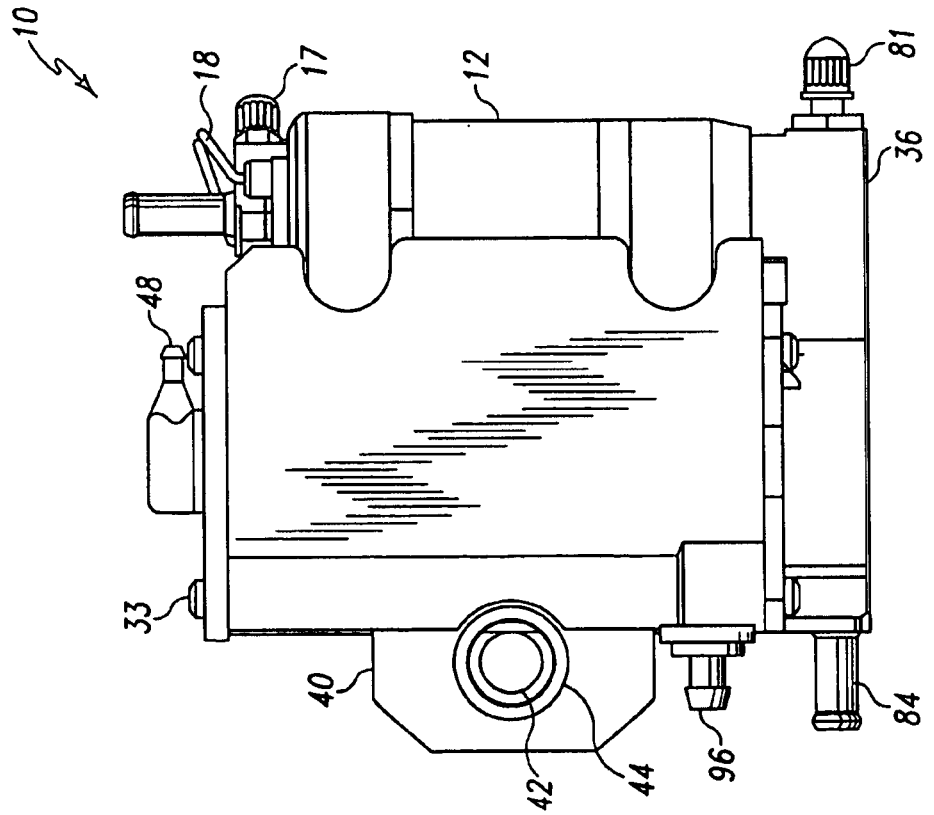
FIG. 3 is a side plan view of the vapor separator in accordance with the present invention.

With reference to FIGS. 1 and 4, a fuel inlet 84 extends through the bottom wall assembly 36 and communicates with the hollow interior portion 86 of bottom wall assembly 36. Fuel inlet 84 is connected to a source of fuel which typically comprises a low pressure pump (not shown) connected intermediately between inlet 84 and a fuel tank (not shown).

With reference FIGS. 2 and 4, positioned internally within chamber 30 of vapor separator assembly 20 is a hollow cylindrical tube which is bent and configured into a coil 90 comprising a multiplicity of circular loops 92. The first and second ends 94 and 96 of tube coil 90 extend through openings in cylindrical hollow member 28 so that the hollow interior of tube coil 90 communicates with the exterior of the vapor separator assembly 20. First intake end 94 of tube coil 90 is at the top of coil 90 and the second outlet end 96 of tube coil 90 is at the bottom of tube coil 90. First intake end 94 is connected to a source of liquid coolant (not shown) which in the case of a Marine engine is typically a pump that pumps water from the lake or ocean water environment in which the engine is operating into the engine for cooling purposes. The coolant water typically is used to cool the combustion chambers of the engine as well as the vapor separator assembly 20. The lake or ocean water or other liquid coolant is pumped through tube coil 90 from the first end to the second outlet end thereby removing heat from the interior chamber 30 of vapor separator assembly 20. The second end 96 is connected to a discharge line (not shown) which returns the water to the lake or ocean. Ends 94 and 96 can be reversed for intake and discharge of coolant.

In typical operation, fuel is pumped into chamber 30 through fuel inlet 84 by the low pressure pump (not shown), which typically is a pulse pump, until the chamber 30 fills and float 60 closes the needle valve assembly 50. When the internal pressure within chamber 30 exceeds the pumping pressure of the low pressure pump, no further fuel enters fuel inlet 84 until the internal pressure drops below the pumping pressure. The low pressure pump typically has a check valve (not shown) which prevents fuel being forced back into the pump if the pressure in chamber 30 increases due to vapor pressure. The fuel in chamber 30 passes through hollow interior 86, fuel delivery channel 76 and is drawn into fuel inlet 14 of pump 12 when power is applied through wires 18 to pump 12. The fuel is then discharged through fuel pump outlet 16 into the connected fuel rail of the fuel delivery system of the internal combustion engine (not shown). In normal operation, the fuel is drawn from the fuel rail and injected into the combustion chambers of the internal combustion engine through fuel injectors (not shown)connected to the fuel rail.

The fuel rail is typically quite hot because it is adjacent the combustion chambers of the internal combustion engine thus heating the fuel in the rail well above the normal fuel temperature. Excess fuel which is not delivered to the fuel injectors is returned by a return line (not shown) from the fuel rail to fuel return inlet 68 and into chamber 30 through passageway 70 and orifice 72. When the rail pressure exceeds the pressure within chamber 30, plunger 74 is moved upwardly to open orifice 72. The outlet of orifice 72 is positioned immediately below tube coil 90 so that the heated fuel passes upwardly through the interior of tube coil 90 within the various loops 92 so that the heated fuel is cooled by the coolant liquid passing through tube coil 90. Thus, the heated fuel is conditioned by cooling to be returned to the high pressure fuel pump and resultant fuel vapor is condensed back into liquid fuel.

Fuel vapor that is not condensed can be released from chamber 30 through needle valve assembly 50 when the fuel level drops sufficiently to allow float 60 to pivot down to pull needle plunger 52 from seat 54. The fuel vapor can then pass through passageway 46 and out vapor outlet 48 to the intake manifold of the engine. If the internal pressure of chamber 30 exceeds a predetermined limit and the needle valve is not open, pressure relief valve 66 can open to allow the fuel vapor to exit chamber 30.

Because the vapor separator assembly 20 is sometimes used in a corrosive environment such as ocean salt water, the vapor separator assembly may be fabricated from corrosive resistant materials such as stainless steel, coated aluminum and/or plastic. Plastic is particularly advantageous because it allows the component parts to be easily and cheaply fabricated by injection molding. Also, because tube coil 90 may have a corrosive liquid, such as ocean salt water, passing through it, tube coil 90 is typically fabricated from corrosive resistant material such as stainless steel, coated aluminum or plastic.

While the present invention has been described in terms of a preferred embodiment, it should be recognized that various alterations, modifications and equivalents aside from those expressly described herein are possible without departing from the spirit and scope of the invention as defined in the appended claims.

What is claimed is:

1. A vapor separator for a fuel pump assembly of an internal combustion engine comprising:

a hollow chamber having a side wall surrounding an interior and a top wall and a bottom wall enclosing said interior to form an enclosed chamber;

a fuel intake communicating into said chamber, said intake connected to a source of fuel so that fuel can be introduced into said chamber;

a fuel outlet from said chamber communicating with the fuel pump assembly so that fuel from said chamber can be conveyed to the fuel pump assembly and pumped into a fuel delivery system of the internal combustion engine;

a hollow tube configured into a coil having a plurality of loops, said coil dimensioned to fit within the interior of said chamber, and positioned within said chamber, said tube having first and second ends extending through a wall of said chamber for connection to respective coolant supply and discharge members;

a source of coolant liquid communicating with the first end of said tube so that coolant can flow through said hollow tube coil within said chamber from the first end to the second end thereby removing heat from said chamber;

said hollow tube having a generally continuous internal diameter between said first and second ends, and said tube coil being formed without sharp bends whereby coolant flowing through said hollow tube is maintained at generally constant velocity therealong;

a fuel return intake into said chamber, said fuel return intake connected to receive heated excess fuel from the fuel delivery system of the internal combustion engine, said heated fuel being cooled by coolant flowing through said coil within said chamber to reduce the temperature of the heated fuel and to condense fuel vapor created by said heated fuel before being conveyed to the fuel pump assembly.

2. A vapor separator as claimed in claim 1, wherein a float actuated valve is provided to vent vapor from said chamber when the fuel in said chamber falls below a predetermined level.

3. A vapor separator as claimed in claim 1, wherein said tube coil is bent so that the first loop commences adjacent to a first end of said tube and each succeeding loop is below the precedent loop and the other second of said tube is bent so that it extends from the last loop at the bottom of said coil.

4. A vapor separator as claimed in claim 1 further comprising a pressure relief valve that opens when a predetermined pressure is reached within said chamber to vent fuel vapor from said chamber.

5. A vapor separator as claimed in claim 1, wherein said tube is fabricated from a corrosive resistant material.

6. A vapor separator as claimed in claim 1, wherein said tube is fabricated from stainless steel.

7. A vapor separator as claimed in claim 1, wherein said tube is fabricated from plastic.

8. A vapor separator as claimed in claim 1, wherein said tube is fabricated from coated aluminum.

9. A vapor separator as claimed in claim 1, wherein said chamber is fabricated from a corrosive resistant material.

10. A vapor separator as claimed in claim 1, wherein said chamber is fabricated from stainless steel.

11. A vapor separator as claimed in claim 1, wherein said chamber is fabricated from plastic.

12. A vapor separator as claimed in claim 1, wherein said chamber is fabricated from coated aluminum.

13. A vapor separator for a fuel pump assembly of a marine internal combustion engine having a cooling system that draws water from the marine operating environment comprising:

a hollow chamber having a side wall surrounding a interior and a top wall and a bottom wall enclosing said interior to form an enclosed chamber;

a fuel intake communicating into said chamber, said intake connected to a source of fuel so that fuel can be introduced into said chamber;

a fuel outlet from said chamber communicating with the fuel pump assembly so that fuel from said chamber can be conveyed to the fuel pump assembly and pumped to the fuel delivery system of the internal combustion engine;

a hollow tube configured into a coil having a plurality of loops, said coil dimensioned to fit within the interior of said chamber, and positioned within said chamber, said tube having first and second ends extending through a wall of said chamber for connection to respective marine coolant supply and discharge members;

the cooling system communicating with the first end of said tube so that water from the marine operating environment can flow through said hollow tube coil within said chamber from the first end to the second end thereby removing heat form said chamber;

said hollow tube having a generally continuous internal diameter between said first and second ends, and said tube coil being formed without sharp bends whereby coolant flowing through said hollow tube is maintained at generally constant velocity therealong;

a fuel return intake into said chamber, said fuel return intake connected to receive heated excess fuel from the fuel delivery system of the internal combustion engine, said heated fuel being cooled by water flowing through said coil within said chamber to reduce the temperature of the heating fuel and condense fuel vapor created by said heated fuel before being conveyed to the fuel pump assembly.

* * * * *

UNITED STATES PATENT AND TRADEMARK OFFICE
CERTIFICATE OF CORRECTION

PATENT NO. : 6,857,419 B1
DATED : February 22, 2005
INVENTOR(S) : Harvey et al.

It is certified that error appears in the above-identified patent and that said Letters Patent is hereby corrected as shown below:

Column 6,
Line 48, replace "heat form" with -- heat from --

Signed and Sealed this

Tenth Day of May, 2005

JON W. DUDAS
*Director of the United States Patent and Trademark Office*